United States Patent

May

(10) Patent No.: US 6,481,336 B2
(45) Date of Patent: Nov. 19, 2002

(54) PISTON WITH PRESSURE-DEPENDENT SEALING EFFECT FOR A PISTON-CYLINDER ARRANGEMENT, IN PARTICULAR A SHOCK ABSORBER PISTON

(75) Inventor: Ewald May, Bonn (DE)

(73) Assignee: GKN Sinter Metals GmbH (DE)

(*) Notice: Subject to any disclaimer, the term of this patent is extended or adjusted under 35 U.S.C. 154(b) by 7 days.

(21) Appl. No.: 09/834,323

(22) Filed: Apr. 13, 2001

(65) Prior Publication Data

US 2002/0056368 A1 May 16, 2002

Related U.S. Application Data

(63) Continuation of application No. PCT/EP99/07640, filed on Oct. 12, 1999.

(30) Foreign Application Priority Data

Oct. 14, 1998 (DE) .......................................... 198 47 343

(51) Int. Cl.$^7$ ................................................. F01B 31/00
(52) U.S. Cl. ..................... 92/185; 188/322.18; 277/467
(58) Field of Search .......................... 92/182, 185, 253; 188/322.18; 277/467

(56) References Cited

U.S. PATENT DOCUMENTS

| 2,240,644 A | * | 5/1941 | Focht ........................ 188/315 |
| 4,821,850 A | | 4/1989 | Geiling et al. .............. 188/315 |

FOREIGN PATENT DOCUMENTS

| DE | 44 21 968 A1 | 1/1996 |
| EP | 0 345 561 | 5/1989 |
| EP | 0 407 865 A2 | 7/1990 |
| EP | 0 557 548 A1 | 2/1992 |
| EP | 0 658 611 A1 | 11/1994 |
| FR | 757.515 | 9/1932 |

* cited by examiner

Primary Examiner—F. Daniel Lopez
(74) Attorney, Agent, or Firm—Woodcock Washburn LLP

(57) ABSTRACT

The invention relates to a piston-cylinder arrangement, especially a shock absorber piston, comprising a piston body fitted with at least two peripheral webs on its peripheral surface, said webs limiting a groove and also including a collar-shaped sealing element made of thermoformable plastic material that overlaps the webs. Said piston also comprises axial passage channels in the piston body that are closed by throttle valves opening on one side and at least one radial hole connecting at least one passage channel to the groove formed between two webs.

19 Claims, 2 Drawing Sheets

Figure 1:
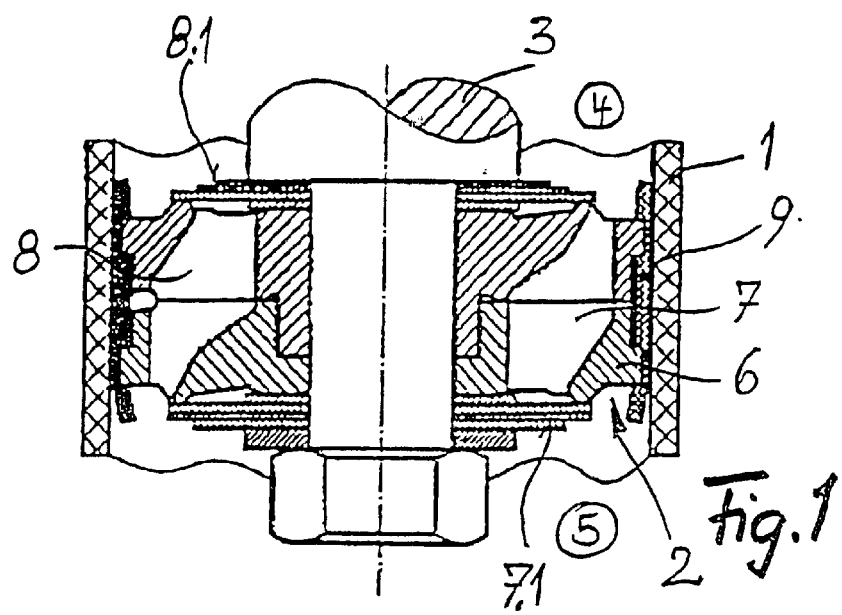

PISTON WITH PRESSURE-DEPENDENT SEALING EFFECT FOR A PISTON-CYLINDER ARRANGEMENT, IN PARTICULAR A SHOCK ABSORBER PISTON

This application is a continuation of number PCT EP99/07640, filed Oct. 12, 1999.

DESCRIPTION

There is a shock absorber piston known from EP-A-0 658 611 that has a piston body that is provided with a peripheral web at its peripheral surface. A number of webs running in the axial direction attach to this peripheral web on one side of it. A seal made of thermoplastic synthetic is sprayed onto this piston body in an injection molding process. The webs extending in the axial direction and the notches between them, which are filled in with sealing material, serve to reliably anchor the sealing material. The seal applied by injection molding enables close tolerancing, which prevents "blow-by" and thus provides a reliable seal of the cylindrical spaces facing one another. The process to produce these types of injection-molded seals is relatively expensive.

There is a piston-cylinder arrangement known from U.S. Pat. No. 3,212,411 whose piston body has a number of peripheral grooves on its peripheral surface. To apply the seal, a cup-shaped preliminary mold made of PTFE (polytetrafluoroethylene) is provided that is first placed on the piston body loosely. The piston body so prepared is then pressed into a forming and calibrating cylinder that is heated to a high temperature. Under the influence of the heat, the PTFE material is pressed into the grooves on the peripheral surface of the piston body. Then, the piston body with the pressed-on seal is cooled in an appropriately designed cooling cylinder. The grooves are completely filled with the sealant material so as to provide a form-locked solid connection of the seal to the peripheral surface of the piston body. When used as a shock absorber piston, the bottom surface of the preliminary mold that still overlaps the end surface of the piston body on one side must then be removed.

There is a shock absorber piston known from EP-A-682 190 whose only essential difference from the processes described above in its manufacture is in that to apply the seal, instead of a cup-shaped preliminary mold, a stamped circular sleeve is used. This circular sleeve is placed on one end of the piston body. The piston body prepared thusly is then pressed into a heated forming and calibrating cylinder, wherein the circular sleeve is placed around the peripheral surface of the piston body as a strip and then pressed into the grooves running in the peripheral direction of the piston body under the influence of heat. Then, the piston with its pressed-on seal is guided through a cooling tube. Here, as well, the sealant material fills the grooves practically completely so that the seal is solidly connected to the peripheral surface of the piston body in form-locked fashion.

The two processes described above have the disadvantage in that considerable pressures are required to shape and to press the sealant material into the grooves on the peripheral surface of the piston body. Also, the sealant material forming the seal is subject to strong shaping forces that disadvantageously influence the structure of the sealant material. Only through exact calibration can the desired degree of seal be reached. Differences in the change in diameter in the piston and cylinder due to temperature influences cannot be compensated any more than seal wear can be compensated.

The objective of this invention is to create a piston, in particular a shock absorber piston, in which the disadvantages described above are prevented.

This objective is met according to the invention by a piston for a piston-cylinder arrangement, in particular a shock absorber piston, with a piston body that is provided with at least two peripheral webs on its peripheral surface that border a notch. Furthermore, in this piston arrangement, a collar-shaped seal made of a thermoformable plastic material is formed onto the webs and overlap them. There are also axial flow channels in the piston body that are closed by means of throttle valves that open on one side only, as well as at least one radial opening that connects at least one flow channel to the notch between two webs. Surprisingly, it has been shown that, in order to get an acceptable and reliable connection between the seal and the piston body, it is not necessary to arrange a multitude of grooves on the peripheral surface of the piston body. A minimum of two peripheral webs bordering a notch are sufficient here, onto which the collar-shaped seal is formed in the manner described in EP-A-682-190. It has also been shown, surprisingly, that it is sufficient for the web to press into the material of the seal only along a portion of its height. On one hand, this results in an acceptable form-lock between the collar-shaped seal and the piston body, and on the other hand, only moderate shaping forces result on the plastic material so that not only do less pressure forces have to be applied, but material flow is also kept to a very minimum during the deformation, thus preventing a disadvantageous influence on the material structure for practical purposes. The collar-shaped seal overlapping the two webs results in a small cavity between the inside surface of the seal and the notch, said cavity encircling the piston body in the peripheral direction. Since the flow channels in the piston body are closed in alternating fashion by the throttle valves that open on one side, a portion of the flow channels are closed by the throttle valves in one direction of motion due to the pressure building up in the cylinder, whereas the throttle valves of the other flow channels open so that the hydraulic fluid can flow through from one cylinder space to the other cylinder space. In the process, a relatively high fluid pressure builds up in the open flow channels. Since at least one of these flow channels is provided with a radial opening that opens up into the annular space between the collar-shaped seal and the notch base, a portion of the hydraulic fluid can enter into this annular space and an corresponding pressure can build up here. Since the collar-shaped seal is made of a plastic material and can be elastically deformed within certain limits, and whereas the annular gap between the outer peripheral surface of the collar-shaped seal on one side and the associated cylinder wall on the other is very small, the collar-shaped seal bulges outward into the annular space under the influence of the pressure, pressing against the cylinder wall. Since the pressure in the flow channel depends on the load on the shock absorber, the seal of the piston in the cylinder depends necessarily on the load.

Depending on which flow channel is chosen to have the radial opening, it is possible to selectively provide this pressure-dependent change in pressure force of the seal for a motion of the piston in one or the other direction.

In another advantageous embodiment of the invention, it is provided that each of the edges of the collar-shaped seal extends beyond the end surface of the piston body associated with it. Since the collar-shaped seal is produced according to a known process from a circular sleeve, the phenomenon of "back memory" of the sealant material described in EP-A-0 682 190 can be used to cause the edge around the inner diameter of the circular sleeve to pull inward after it is applied to the piston body, and to cause the edge of the collar-shaped seal produced from the external edge of the circular sleeve to move back outward and in this way to protrude above the rest of the peripheral surface of the collar-shaped seal as a lip seal. If the piston body is installed such that, when used as a shock absorber piston, the piston surface provided with the lip-shaped edge extending outward faces the pressurized side, i.e. the side subjected to the high load, and if the piston surface with the edge that springs back inward is located on the so-called suction side, this results in an improved seal of the piston in the shock absorber cylinder during a pressure load since the hydraulic fluid in the lip-shaped edge presses against the cylinder wall.

When it springs back, i.e. for suction loads, the hydraulic fluid can then enter the intermediate space between the piston wall and the cylinder wall to some degree as a result of the minimal play between the two. The fluid can thus find its way up to the edge where the lip-shaped edge of the collar-shaped seal sits against the cylinder wall for the purposes of lubrication. Thus, acceptable lubrication is provided, preventing wear of the seal. Since the flow resistance due to this minimum gap between the sealing surface of the piston and the cylinder wall is considerably higher than the flow resistance through the flow channels in the piston body, practically no drop in performance results.

The reduction of sealing effect of the collar-shaped seal described above during spring-back can now be smoothed out with the concept according to the invention by assigning the radial opening in the piston body to at least one of the flow channels that has hydraulic fluid flowing through it against the action of the throttle valve during spring-back, i.e. when under suction. As a result of the elastic deformation of the collar-shaped seal caused by the pressure build-up in the annular space, this motion causes the seal to be pressed against the cylinder wall, thus compensating for the reduced seal effect caused by the lack of the lip seal.

In an especially advantageous embodiment of the invention, it is provided that the webs are each located in the area adjacent to the end surface of the piston body. This geometry purposefully provides only two webs, which then sit on both sides of only one notch in the peripheral surface of the piston body lying in between. The webs can be dimensioned to be relatively wide; the notch laterally bordered by the webs can then be twice to three times as wide as the width of a web. This simplifies the contour of the peripheral surface of the piston body considerably.

In an especially advantageous embodiment of the invention, the piston body is pieced together from at least two element sections, each of which has a plane of separation that runs perpendicular to the piston axis. This type of piston body design is suited for manufacture using a powder-metallurgy process, i.e. as a sintered metal part. The form of the two element sections is particularly favorable if each element section has only one peripheral web so that the mirror-imaged element sections pieced together border a notch with their webs. This allows the manufacture of an [undercut] notch.

In a variation of the invention, furthermore, two collar-shaped seals are arranged next to one another on a piston body with two webs, each of these seals covering a web. The edges of the seals extending beyond the end surfaces of the piston body can be formed to face in and/or out and the other edges of the two seals can be formed to lie adjacent to one another near the notch between the two webs. Since the sealing function under load is essentially a result of the edges of the seal acting as a lip seal, the hydraulic fluid flowing in from a flow channel through the radial opening into the notch can, by appropriate minimal dimensioning the radial opening, flow through the gap between the two collar-shaped seals and at the same time lubricate the sealing surfaces between the cylinder wall and the collar-shaped seal. Since the radial opening itself acts as a throttle, only a minimal pressure build-up results in the area of the notch so that the sealing effect of the lip seal on the respective pressure side is not affected. The lip seal located on the low pressure side can however "float on top" of the hydraulic fluid flowing out of the gap between the two collar-shaped seals resulting in lubrication.

Figure 2:
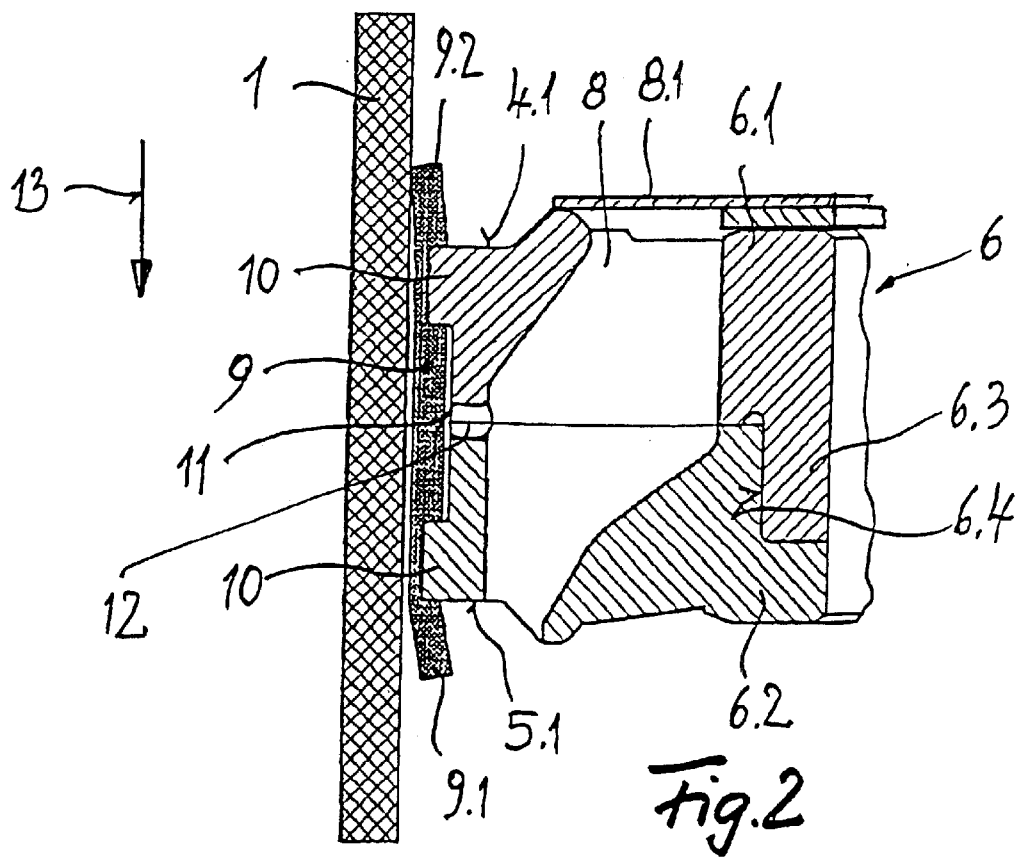
Figure 3:
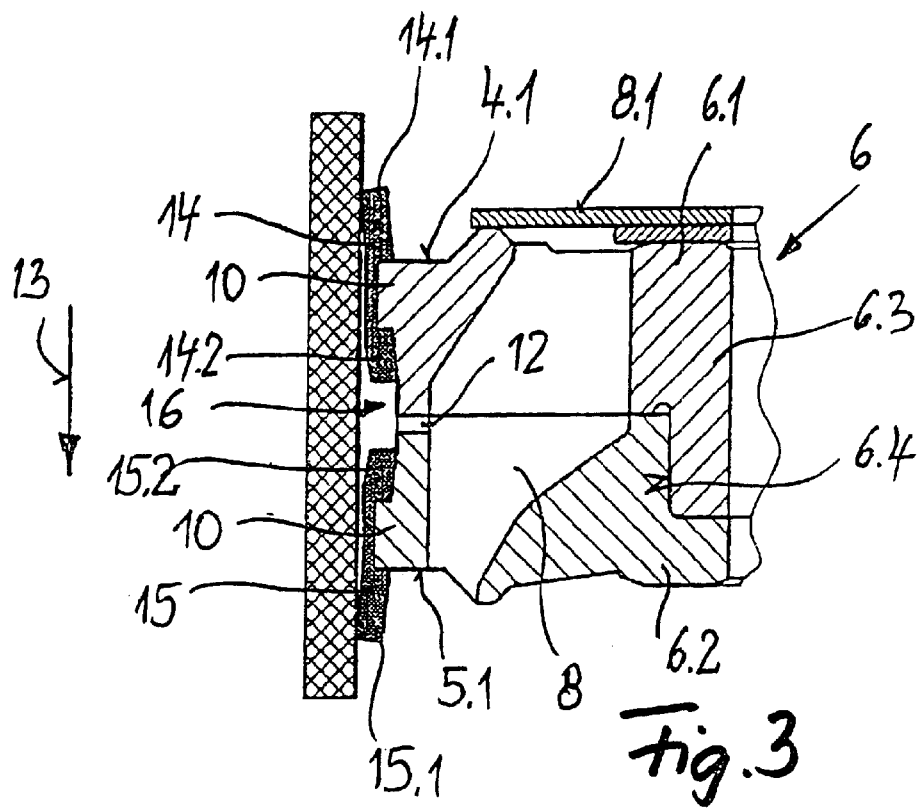

The invention is explained in more detail with the help of schematic drawings of an embodiment example. Shown are:

FIG. 1 a partial section in the axial direction through a piston-cylinder arrangement for a shock absorber, FIG. 2 an enlarged partial section through the piston of the arrangement according to FIG. 1, FIG. 3 an embodiment with a two-part collar-shaped seal.

Figure 4:
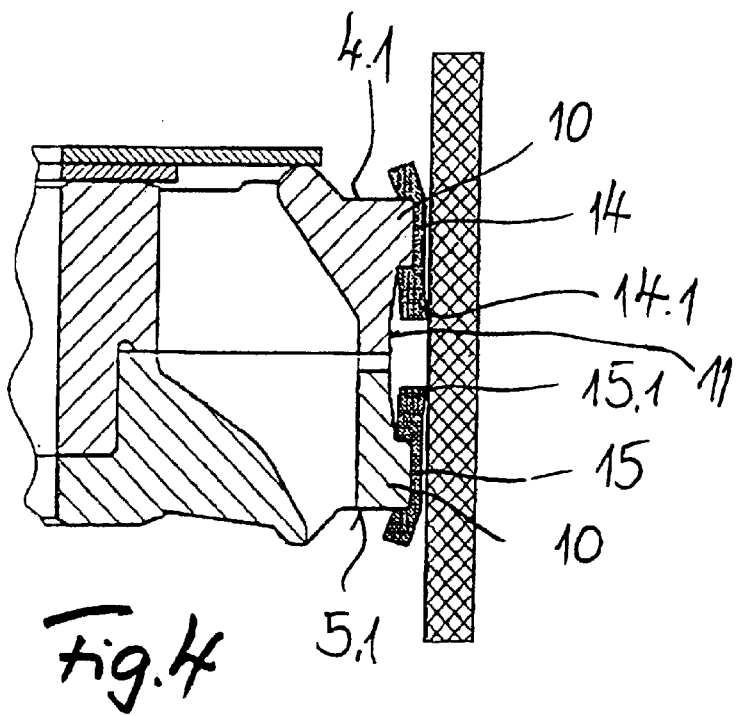

FIG. 4 a variation of the embodiment according to FIG. 3.

FIG. 1 shows an axial section through a shock absorber that connects two parts that are movable relative to one another, for example a vehicle axis and a vehicle frame. The shock absorber has a cylindrical part 1 that is connected to one of the two parts that are movable with respect to one another. A piston 2 is guided inside cylinder 1 that is fastened to a piston rod 3 whose free end is fixed to the other part of the parts moving relative to one another. The cylinder 1 is closed on both sides and is filled with a hydraulic fluid so that the piston-cylinder arrangement is designed to be dual-acting, with the piston separating two cylinder spaces 4, 5 from one another.

The piston body 6 of the piston 2 has a number of penetration channels 7, 8 running alongside one another. A throttle valve 7.1 and 8.1 covers the exit side of each of the penetration channels 7, 8. The function of these exits is yet to be explained. This arrangement is designed such that, for example, three penetration channels 7 and three penetration channels 8 are arranged in the shape of a star in alternating fashion around the cylinder axis.

The peripheral surface of the piston 2 is provided with a collar-shaped seal 9 that seals off cylinder space 4 against cylinder space 5. When the piston 2 moves toward cylinder space 4, the fluid is pushed through the penetration channels 7 against the return force of the throttle valve 7.1. The penetration openings 8 are held shut by the pressure of the fluid space 4 acting on the throttle valve 8.1. When it moves in the reverse direction, the penetration channels 7 are closed by throttle valve 7. 1, with the fluid now able to flow back through the flowing channels 8 out of cylinder space 5 into cylinder space 4.

FIG. 2 shows a piston 2 in an enlarged representation in a partial section. The piston body 6 is provided with two webs 10 on its peripheral surface, which are arranged in the embodiment example shown here such that they also contain a portion of the respective end surface 4.1 or 5.1 of the piston body 6. The two webs 10 border a notch 11 on the peripheral surface of the piston body 6.

The collar-shaped seal 9 arranged on the peripheral surface of the piston body 6 consists of a thermoplastic synthetic material, preferably PTFE. In the embodiment example shown here, the collar-shaped seal 9 was formed onto the peripheral surface of the piston body 6 by heat forming a circular sleeve, with edge 9.1 of the seal 9 being formed by the inner edge of the circular sleeve and edge 9.2 being formed by the outer edge of the circular sleeve. The width of the circular sleeve was dimensioned such that it was wider than the thickness of the piston body 6 in the axial direction. By doing so, edge 9.1 produced by the inner edge of the circular sleeve is pulled inward after it deforms, whereas edge 9.2 produced by the outer edge of the circular sleeve is bent outward, thus forming a functioning lip seal.

In heat forming the circular sleeve, the webs 10 press into the material of the collar-shaped seal 9 over only a portion of their height so that a certain amount of free space remains between the material of the seal 9 and the bottom of the notch 11. This allows the sealing material to freely flow into the notch 11 without being squeezed when the seal 9 is formed. In this shaping process, the cylindrical exterior surface 13 of the seal 9 is simultaneously calibrated so that the desired tolerances to the inner diameter of the cylinder 1 can be maintained. Since the overall system heats up during operation, especially when these piston-cylinder arrangements are used as shock absorbers, this remaining free space in the base of the notch also allows the sealing material to expand into the notch within certain limits so that the wear of the seal on the peripheral surface of the seal 9 adjacent to the edges is reduced.

As indicated in FIG. 1 and made more evident in the enlarged representation in FIG. 2, the piston body 6 is provided with a radial opening 12 that connects the notch 11 in the embodiment shown with the penetration channel 8. When the piston 2 moves in the direction of the arrow 13, a relative pressure builds up in the penetration channel 8 under the influence of the throttle valve 8.1. This pressure also acts in the space between the collar-shaped seal 9 and the notch 11. If the opening is dimensioned large enough to have practically no throttling effect, the entire pressure acts on this space so that the collar-shaped seal 9 bulges outward accordingly and is pressed against the inner wall of the cylinder 1 depending on the pressure. This compensates the reduced sealing effect of the edge 9.2 acting as a lip seal when the piston 2 moves in the direction of the arrow 13 by pressing the seal 9 against the cylinder wall. By reducing the diameter of the radial opening 12 accordingly, the opening can also act as a throttle so that less pressure builds up in the space beneath the collar-shaped seal 9, thus reducing the pressure force of the seal against the cylinder wall. Here, it is useful if each of the penetration channels 8 is provided with its own radial opening [connected to] the annular space below the collar-shaped seal 9 in order to attain an even pressure build-up in the annular space.

In FIG. 3, a different embodiment is shown. In this embodiment, two collar-shaped seals 14, 15 are provided that are attached such that each of the external edges 14.1 and 15.1 face outward, whereas the inner edges 14.2 and 15.2 are pulled inward. The two edges 14.2 and 15.2 can directly butt up against one another, and the collar-shaped seal 14 can overlap the area of the penetration opening 12. It is useful to dimension the penetration opening 12 such that it allows a small amount of hydraulic fluid through when strong throttling occurs under a pressure load, which then can exit through the gap 16 between the two collar-shaped seals 14, 15 and provide lubrication as a result. The penetration openings 12 can be arranged such that the piston 2 is lubricated both in the forward motion, i.e. in the direction of arrow 13, as well as the rear motion, i.e. opposite to the direction of the arrow 13.

As can be seen furthermore by comparing FIG. 2 and FIG. 3, when using a two-part seal, the forming of the material of the two collar-shaped seals 14 and 15 can be carried out to the extent that each of the webs 10 press into the material to its full height. By having the notch base bow inward somewhat from the webs 10, this, in connection with the back memory ability of the plastic material described above, results in a reliable anchoring of the collar-shaped seals on only one web.

In FIG. 4, a variation of the embodiment according to FIG. 3 is shown that, for practical purposes, differs only in that the lip seals 14.1 and 15.1, which are produced from the outer edge of the circular sleeve used in the manufacture of the collar-shaped seal, are located near the notch 11. They can also be arranged such that the outward-facing edges 14.1 and 15.1 of the two seals 14 and 15 are arranged with seal 14 formed onto the web with its edge 14.1 positioned with respect to the piston body 6 according to FIG. 2 and with the edges of seal 15 arranged with respect to its web on the piston body 6 according to the embodiment of FIG. 3. This results in the outward-facing edge 14.1 of seal 14 being associated with the end surface and the outward-facing edge 15.1 of seal 15 running along the notch 11.

As can be seen in FIG. 1 and FIG. 2, the piston body 6 is produced from two element sections 6.1 and 6.2. The shape of the contours of the penetration channels 7 and 8 in one section is identical with that in the other section in the embodiment example shown so that regardless of the arrangement of a bushing 6.3 on element section 6.1 and a corresponding recess 6.4 in element section 6.2, both element sections have the identical external form and are designed without back tapering [undercutting], which hinders the pressing process. This makes it possible to form this kind of a piston body 6 from two element sections produced through powder metallurgy, said sections being pressed as element sections from a sinterable metallurgical powder. The pressed element sections are then put together in an assembly operation and then sintered. This is just the kind of manufacturing process that allows the element sections to be produced such that the penetration channels can be formed differently depending on the different flow conditions for suction and pressure loads.

Depending on the manufacturing process, it is also possible to provide more than two webs so that every two respective adjacent webs border a notch, resulting in a higher number of notches accordingly. It is sufficient here if only one penetration opening 12 opens up into a notch.

The piston body 6 can also have other geometrical designs and can also be manufactured through machining processes.

What is claimed is:

1. A piston for a piston-cylinder arrangement, said piston comprising a piston body that is provided with at least two peripheral webs on its peripheral surface that border a notch, a collar-shaped seal formed of a material comprising a thermoplastic material that is formed onto the webs and that overlaps the webs, axial flow channels in the piston body that are closed by means of throttle valves that open on one side, and at least one radial opening that connects at least one of the flow channels to the notch between the at least two webs.

2. A piston according to claim 1, wherein the collar-shaped seal covers the notch between the at least two webs, sealing it off.

3. A piston according to claim 1, wherein the piston body is assembled from at least two element sections and has a plane of seperation running perpendicular to the piston axis, and the radial opening runs near the plane of seperation.

4. A piston according to claim 3, wherein each element section of the piston body has one peripheral web.

5. A piston according to claim 1, wherein the piston body is manufactured using powder metallurgy.

6. A piston according to claim 1 wherein each of the webs are located in areas adjacent to end surfaces of the piston body.

7. A piston according to claim 1 wherein each of two edges of the collar shaped seal extends beyond its associated end surface of the piston body.

8. A piston according to claim 1 wherein two collar-shaped seals are located next to one another on one piston body having two webs, each of the seals covering on web.

9. A piston according to claim 1, wherein the piston is a shock absorber piston.

10. A piston-cylinder arrangement comprising:
   a cylinder; and
   a piston movably disposed within the cylinder, said piston comprising:
      a piston body including at least two peripheral webs formed on a peripheral surface thereof, the peripheral webs bordering a notch;
      a collar-shaped seal formed of a material comprising a thermoplastic material that is formed onto the webs and that overlaps the webs;
      axial flow channels formed in the piston body that are opened and closed by throttle valves that open on one side; and
      at least one radial opening that connects at least one of the flow channels to the notch.

11. A piston-cylinder arrangement according to claim 10, wherein the collar-shaped seal covers the notch between the at least two webs, thereby sealing it off.

12. A piston-cylinder arrangement according to claim 10, wherein the piston body is assembled from at least two element sections and has a plane of seperation running perpendicular to the piston axis.

13. A piston-cylinder arrangement according to claim 12, wherein the radial opening runs near the plane of separation.

14. A piston-cylinder arrangement according to claim 12, wherein each element section of the piston body has one peripheral web.

15. A piston-cylinder arrangement according to claim 10, wherein the piston body is manufactured by processes including powder metallurgy.

16. A piston-cylinder arrangement according to claim 10, wherein each of the webs are located in areas adjacent to end surfaces of the piston body.

17. A piston-cylinder arrangement according to claim 10 wherein each of two edges of the collar shaped seal extends beyond its associated end surface of the piston body.

18. A piston-cylinder arrangement according to claim 10, wherein two collar-shaped seals are located next to one another on one piston body having two webs, each of the seals covering one web.

19. A piston-cylinder arrangement according to claim 10, wherein the piston is a shock absorber piston.

* * * * *